United States Patent Office 2,895,108
Patented July 14, 1959

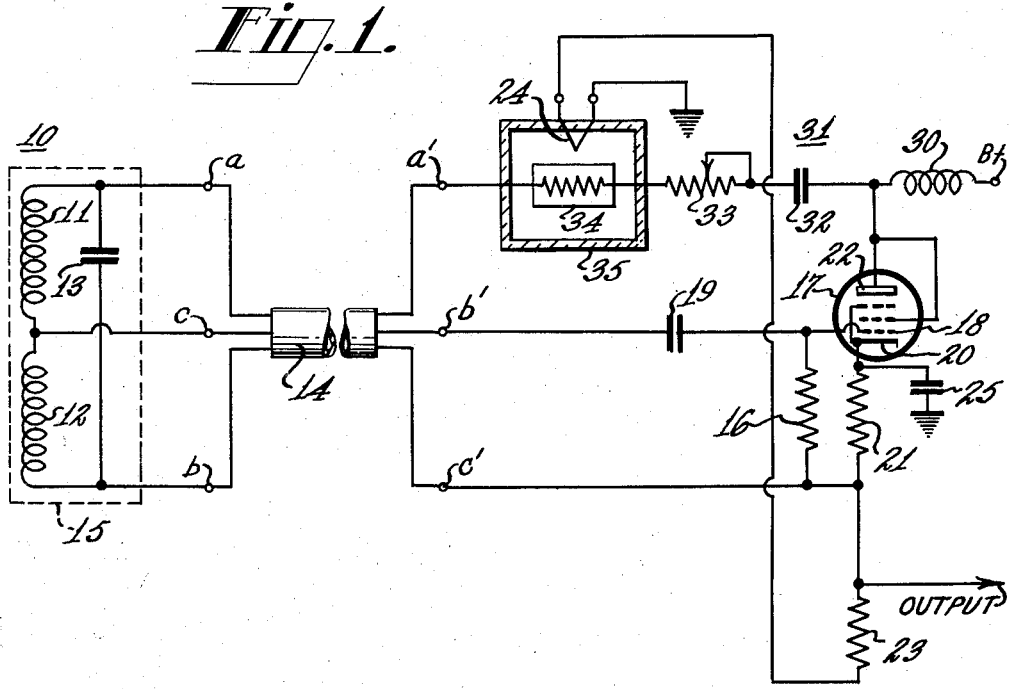
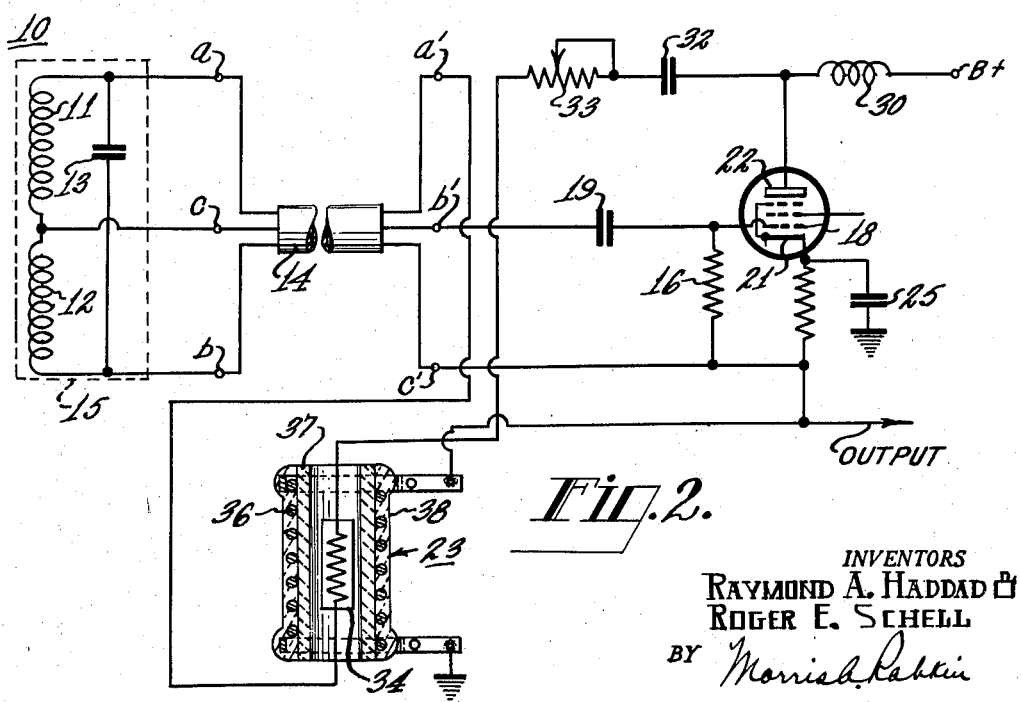

2,895,108

ELECTRONIC CIRCUIT

Raymond A. Haddad, Haddonfield, and Roger E. Schell, Woodbury, N.J., assignors to Radio Corporation of America, a corporation of Delaware Application December 22, 1955, Serial No. 554,850

10 Claims. (Cl. 331—176)

The present invention relates to an improved electronic circuit, and more particularly to an improved oscillator circuit that is compensated for changes in weather conditions and operating conditions. This invention is especially useful in connection with metal detectors, although it will find general application in other electronic equipment.

Oscillator circuits ordinarily will be affected to some degree by changes in weather conditions and operating conditions. For example, the normal operating frequency of an oscillator may vary, as may the amplitude of the oscillations which are produced. Sensitive oscillators fail to perform properly due to fluctuating weather and operating conditions in most instances.

In metal detectors, an oscillator may be used to establish an electromagnetic field in an inspection zone. A particle of metal disturbs this field in passing through the inspection zone. This field disturbance is reflected by a change in the mode of operation of the oscillator, usually of short duration. Since metal detectors must be highly sensitive in order to detect minute particles of metal, sensitive oscillators are used so that an immediate response is exhibited when the electromagnetic field in the inspection zone is disturbed. It follows, therefore, that the present invention may be used to particular advantage in improving the operation of such sensitive oscillators as are used in metal detecting equipment.

Changing weather conditions may be expected to include not only changing temperatures, but, in addition, changes in other weather factors, such as humidity. Previous efforts have been directed towards compensating oscillators, and other electrical circuits for changes in temperature, and have disregarded, to a major extent, the adverse effects of other weather factors. In addition, it is desirable to compensate electrical circuits for changes in operating conditions, such as the magnitude of supply voltages and currents. By means of the present invention compensation is simultaneously and automatically made for most changing weather conditions, such as temperature and humidity, and changes in operating conditions.

It is an object of the present invention to provide improvements in electronic circuits.

It is a further object of the present invention to provide an improvement in oscillator circuits for compensating such circuits for changes in weather conditions and operating conditions.

It is a still further object of the present invention to provide improved oscillator circuits suitable for use in metal detecting equipment which have maximum sensitivity and greater reliability and which permit unattended operation of said equipment with greater safety.

An improved oscillator circuit incorporating the present invention in an illustrative form thereof includes an electronic amplifier, such as an electron tube. An input circuit, which may include a tuned network that determines the oscillation frequency, and an output circuit are also provided. The input circuit is connected to the output circuit by means of a feedback coupling. A thermally sensitive impedance device such as a thermally sensitive resistor is inserted in this feedback arrangement. Thermally sensitive resistors are termed thermistors and will be referred to as such hereafter in the description of the present invention. The thermistors have a negative temperature coefficient of resistance over a significant range of temperature. Consequently, as the temperature of the thermistor increases, the resistance thereof decreases. In this respect, thermistors operate in a manner opposite to usual electronic components. As the temperature of the components in the circuit changes due to varying weather conditions, the resistance of these components will change correspondingly. The resistance of the thermistor also changes in accordance with temperature. But the resistance change of the thermistor is in a sense opposite to the resistance change of the circuit components. It may be seen, therefore, that the thermistor compensates the circuit for changes in external temperature.

In accordance with the present invention, however, the thermistor may be thermally independent, to a substantial degree, from variations in external temperature. Instead, the extent to which the thermistor is heated is controlled by the current flowing in the oscillator circuit. For example, the thermistor may be heated by the current flowing through the electronic amplifier in the oscillator circuit. Consequently, the temperature of the thermistor changes only in accordance with the magnitude of the current flowing in the circuit. It will be appreciated that, in addition to changes in temperature, the effective resistance of the components in the oscillator circuit will be varied by changes in humidity, changes in other weather conditions, and changes in circuit operating conditions. The magnitude of current flowing in the oscillator circuit will change accordingly. The current changes will be reflected as changes in the resistance of the thermistor. Consequently, the thermistor will serve to automatically compensate the circuit for changes in the various factors which may effect its operation.

The above mentioned and other objects and advantages of the present invention will, of course, become apparent and immediately suggest themselves to those skilled in the art to which the invention is directed from a reading of the following specification in connection with the accompanying drawing in which:

Figure 1 is a diagram showing an oscillator circuit, suitable for metal detectors, incorporating the present invention; and Figure 2 is a diagram showing an oscillator circuit of the type illustrated in Figure 1 which incorporates a modified form of the present invention.

In Figure 1, an oscillator incorporating the present invention is shown. This oscillator circuit is representative of the type that may be used in metal detecting equipment. As pointed out above, oscillators for metal detectors are designed to be inherently sensitive so that the improvement provided by the present invention is especially useful therein. It will be appreciated that other oscillator circuits may incorporate the present invention, and that a metal detector oscillator is described herein solely for purposes of illustrating the present invention in an appropriate setting.

The detection coil system of a metal detector may be arranged on a framework which forms an aperture. The articles to be inspected are conventionally passed through the aperture on a conveyor belt. In metal detectors of the type described herein, the detection coil system forms the inductor in the tank circuit of the metal detector oscillator. Consequently, the tank circuit usually forms a unit separable from the other circuitry of the metal detector and is indicated in the drawing as being enclosed by the dashed lines 15.

As shown in Figure 1, the detection coil system 10 consists of two coils 11 and 12 which are connected together in series. These coils 11 and 12 may be arranged side by side on a framework, such as the framework referred to above. The coils 11 and 12, therefore, are magnetically coupled to each other. The detection coil system 10 forms the tank circuit for the oscillator together with a capacitor 13 which is connected across the unjoined ends of the coils 11 and 12. The capacitor 13 is ordinarily placed with the detection coil system 10 in the framework which forms the inspection aperture. Since the detection coil system 10 and the capacitor 13 are a separate unit, which is indicated on the drawing by the dashed lines 15, they are connected to the rest of the oscillator circuit by means of a cable 14.

A terminal $a$ is connected to one end of the tank circuit. Another terminal $b$ is connected to the opposite end of the tank circuit. Still another terminal $c$ is connected to the junction of the detection coils 11 and 12. The cable 14 is a three-wire cable. The terminals $a$, $b$ and $c$ are connected to a different one of the wires in the cable 14. The cable 14 may desirably be a shielded cable of any well known design. At the far end of the cable, the wires are connected individually to one of three terminals $a'$, $b'$, $c'$ which are located with the other units of the metal detector. The terminal $a'$ is connected through one of the wires of the three-wire cable 14 to the terminal $a$ that is located with the tank circuit. Similarly terminals $b'$, $c'$ are connected through different wires of the three-wire cable 14 to the terminals $b$ and $c$ respectively.

The oscillator circuit illustrated in Figure 1 will be recognized as being a slightly modified version of the well known Hartley oscillator. It includes a pentode tube 17 that is triode connected. The oscillator may be considered as being provided with input and output circuits. The input circuit includes the remotely located tank circuit consisting of the detection coil system 10 and the capacitor 13. The grid 18 of the tube 17 is connected to one end of the tank circuit through a capacitor 19.

The junction of the detection coils 11 and 12 is connected to the cathode 20 through a cathode resistor 21. A grid resistor 16 is connected between the grid 18 and the low voltage end of the cathode resistors 21. The output circuit of the oscillator is effectively connected between the plate 22 and the cathode 20. This output circuit includes the cathode resistor 21 and another resistor 23 connected to the low voltage end thereof. A heater element 24, to be described later, is connected between the last mentioned resistor 23 and ground. This heater 24 is, therefore, included in the output circuit of the oscillator. A capacitor 25 is connected from the cathode 20 to ground thereby shunting sinusoidal, high frequency oscillations around the cathode resistors 21, and 23 and the heater 24. A source of operating voltage conveniently designated at B+ is connected to the plate 22 by way of a radio frequency choke 30. The output circuit is connected to the input circuit by a feedback coupling 31.

This feedback coupling is connected between the plate 22 and the terminal $a'$. The terminal $a'$ is connected through the cable 14 to an end of the tank circuit that is opposite to the end already connected to the grid 18. The feedback circuit consists of a capacitor 32, a variable resistor 33, and a thermistor 34.

The thermistor 34 is enclosed in a container 35. The thermistor utilized in the illustrated oscillator circuit is, as heretofore described, a thermally sensitive resistor having a negative temperature coefficient of resistance over a range of temperatures. Thermistors are composed of compositions of various metallic oxides. They are available in several different types which are characterized by different thermal sensitivities. The bead type thermistor may be found suitable in oscillators of the type illustrated herein since they have a high thermal sensitivity. The thermal sensitivity of a thermistor is a measure of the rapidity with which it will reflect a change in temperature. Alternatively, the thermal sensitivity of a thermistor may be expressed as a time constant in terms of the time it takes for the thermistor to change resistance by a given amount. For further information regarding thermistors reference may be made to an article entitled "Characteristics and Applications of Thermistors" appearing in the June 1955 issue of Electrical Communications magazine.

In the illustrated oscillator, the detection coil system 10 in the tank circuit and the cable 14 have been found to be most affected by changes in weather conditions. This is particularly the case where the metal detection equipment is used in the field, as for example, in mining operations. A change in weather conditions, such as an increase in temperature, will cause the resistance of the detection coil 10 and the cable 14 to increase. This increase in resistance will be reflected as an increased load on the oscillator. The immediate result of this increased load will be a decrease in the amplitude of oscillation. Such reduction in the amplitude of oscillation causes a decrease in the negative bias normally applied to the grid 18 of the oscillator tube 17 by the operation of the grid resistor 16 and the grid coupling capacitor 19. The current through the tube, therefore, increases.

Without the addition of the improvement provided by the present invention, an increase in the tube current would tend to restore stable operation of the oscillator by increasing the amplitude of oscillations. In sensitive oscillators of the type illustrated in the drawing, however, such attempted increase in the amplitude of oscillation tends to overdrive the tube 17 so that an abnormal amount of grid current is drawn. Because of the tube and circuit characteristics, the change in grid bias resulting from this increased grid current causes the interruption of oscillations. The criteria necessary for oscillation to be sustained in the circuit are not met when an extraordinary amount of grid current is drawn.

It will be observed that the electromagnetic field established by the detection coil system 10 collapses as soon as oscillation ceases, and the metal detector is no longer useful. Without the improvement afforded by the present invention, unattended operation of the metal detector may not be possible with utmost safety.

The present invention operates to prevent interruptions in oscillation. When the resistance of the detection coil system 10 and the cable 14 changes because of changing weather conditions, the amount of tube current (plate current) varies accordingly. Reconsidering the above-stated situation, when the ambient temperature rises, an increase in the resistance of the detection coil system 10 and the cable 14 produces increased tube current. This tube current is carried by the output circuit of the oscillator. Consequently, it passes through the tube 17 from plate 22 to cathode 20, the cathode resistors 21 and 23, and the heater 24. The heater 24 generates an increased amount of heat. The thermistor 34 is, therefore, heated. Immediately, the temperature thereof rises because of its inherent thermal sensitivity. Since the thermistor 34 has a negative temperature coefficient of resistance, the resistance of the thermistor 34 immediately decreases. The decreased resistance of the thermistor provides compensation for the increase in resistance in the other components of the oscillator circuit, particularly the detection coil system 10 and the cable 14.

It may be observed that the temperature of the thermistor will change in accordance with any changes in tube current. Consequently, the oscillator circuit will be compensated for changes in the effective resistance of its components such as may be caused by humidity, other weather factors, and operating voltages.

The output of the oscillator may be obtained at any point in the output circuit, such as across any of the cathode resistors 21 and 23 or at the plate 22 of the tube 17. In the drawing, the output is indicated as being obtained from the junction connecting the cathode resistors 21 and 23. This output signal is applied to control elements in the metal detector which operate in response to the detection of a metal particle. The output signal that is exhibited when a metal particle is indicated is in the form of a voltage impulse.

In Figure 2 there is shown a modified form of the present invention. Since the circuit illustrated in Figure 2 is similar, in construction and operation, to the circuit illustrated in Figure 1, like reference numerals will be used to designate like parts.

The thermistor 34 utilized in this modified form of the present invention is not enclosed in a container. However, the temperature thereof is controlled by the current flowing in the tube 17. The heat generated by the resistor 23 is used to control the temperature of the thermistor 34.

This resistor 23 may be a conventional type of wire wound resistor. A resistance winding 36 is arranged on a hollow, cylindrical ceramic core 37. The winding 36 is imbedded in a ceramic coating 38 that surrounds the cylindrical ceramic core 37. The thermistor 34 is inserted into the opening in the cylindrical core 37. Consequently, the thermistor is coupled in heat exchange relationship with the resistor 33.

The amount of heat generated by the resistor 23 will be determined by the magnitude of the current flowing therethrough, which current is the direct current component of the tube current. Since the thermistor 34 is inherently very thermally sensitive, it will respond to changes in the amount of heat generated by the resistor 23. This modified form of the present invention consequently operates in a manner similar to the form of the invention illustrated in Figure 1.

Solely by way of example, a set of suitable values for the components in the oscillator circuits illustrated in Figures 1 and 2 are specified below.

| | |
|---|---|
| Detection coil system 10 | 400 $\mu$h. |
| Radio frequency choke 30 | 80 mh. |
| Thermistor 34 | Type TX 452, manufactured by Victory Engineering Company, Union, New Jersey. |
| Tube 17 | Type 6V6. |
| Capacitor 13 | 5600 $\mu\mu$f. |
| Capacitor 19 | 82 $\mu\mu$f. |
| Capacitor 25 | 0.1 $\mu$f. |
| Capacitor 32 | 4700 $\mu\mu$f. |
| Resistor 16 | 470,000 ohms. |
| Resistor 21 | 33 ohms. |
| Resistor 23 | 2,000 ohms. |
| Resistor 33 | 20,000 ohms max. |
| Heater 24 | Supplied with thermistor 34 in glass container 35 by Victory Engineering Company, Union, New Jersey. |

What is claimed is:

1. In an electronic circuit including an electronic amplifier device having a plurality of circuit components connected thereto, an improvement for compensating said electronic circuit for changes in weather and operating conditions comprising means connected to said amplifier device responsive to the magnitude of the total current flowing therethrough, said means including means for generating heat in accordance with the magnitude of the total current flowing through said amplifier device, a thermally sensitive electrical device provided with a characteristic such that the impedance thereof varies with temperature in a manner inverse to the impedance of said components connected to said electronic amplifier device, said electrical device being connected in said circuits connected to said electronic amplifier device, and means for coupling said electrical device and said heat generating means in heat exchange relationship with each other.

2. In an electronic circuit including an electronic amplifier device having input and output circuits connected thereto, an improvement for compensating said electronic circuit for changes in weather and operating conditions comprising means connected in series with said amplifier device and responsive to the magnitude of the total current flowing therethrough, said means including heat generating means responsive to the total current flowing through said amplifier device, a thermally sensitive electrical device provided with a characteristic such that the impedance thereof varies with temperature in a manner inverse to the impedance of said circuits connected to said electronic amplifier device, said electrical device being connected in one of said circuits connected to said electronic amplifier device, and means for coupling said electrical device and said heat generating means in heat exchange relationship with each other.

3. In an oscillator circuit including an electronic amplifier device having an input circuit and an output circuit connected thereto, and means for coupling said output circuit to said input circuit whereby oscillations are generated; an improvement for compensating said circuit for changes in weather conditions and operating conditions comprising a thermally sensitive electrical impedance device included in said coupling means, said impedance device having a negative temperature coefficient of impedance, means connected to said amplifier device responsive to the magnitude of the total current flowing therethrough, said means including heat generating means controlled by the total current flowing through said amplifier device, and means for coupling said heat generating means to said impedance device in heat exchange relationship with each other.

4. In an oscillator circuit including an electronic amplifier device having an input circuit and an output circuit connected thereto, and a feedback circuit connecting said output circuit to said input circuit whereby oscillations are generated; an improvement for compensating said circuit for changes in weather conditions and operating conditions comprising a thermally sensitive resistor connected in said feedback circuit, said resistor having a negative temperature coefficient of resistance, means connected in series with said amplifier device and responsive to the magnitude of the total current flowing therethrough, said means including heat generating means controlled by the total current flowing through said amplifier device, and means for coupling said heat generating means and said resistor in heat exchange relationship with each other.

5. In an oscillator for a metal detector, said oscillator comprising an electronic amplifier device including an electron tube, an input circuit connected to said amplifier device including a tuned circuit provided with a coil system whereby an electromagnetic field is established, and an output circuit connected to said amplifier device; an improvement for compensating said oscillator for changes in weather conditions and operating conditions comprising a feedback coupling connected between said output circuit and said tuned circuit, a thermistor connected in said feedback coupling, and means connected in series with said tube for controlling the temperature of said thermistor in response to the magnitude of the total current flowing through said electronic amplifier.

6. In a metal detector an oscillator circuit including an electron tube having a plate, a cathode and a control grid, an inspection aperture including a tuned circuit, said tuned circuit being connected to said control grid, an output circuit connected between said plate and said cathode for carrying the total current flowing through said tube, and a feedback coupling between said output circuit and said tuned circuit; an improvement for compensating said oscillator circuit for changes in weather conditions and operating conditions comprising a thermistor connected in said feedback coupling, and means connected in said output circuit for controlling the temperature of said thermistor in accordance with the magnitude of said total current flowing through said tube.

7. The invention as defined in claim 6 wherein said means for controlling the temperature of said thermistor is an electric heating element.

8. The invention as defined in claim 6 wherein said thermistor is enclosed in a sealed container made of insulating material, and wherein said means for controlling the temperature of said thermistor is an electric heating element, said element being enclosed in said container with said thermistor.

9. The invention as defined in claim 6 wherein said means for controlling the temperature of said thermistor is a resistor connected in said output circuit, said resistor being coupled in heat exchange relationship with said thermistor.

10. The invention as defined in claim 9 wherein said resistor has an opening therein, and wherein said thermistor is inserted in said opening.

References Cited in the file of this patent

UNITED STATES PATENTS

| | | |
|---|---|---|
| 2,163,403 | Meacham | June 20, 1939 |
| 2,258,128 | Black | Oct. 7, 1941 |
| 2,483,070 | Spindler | Sept. 27, 1949 |
| 2,539,218 | Worcester | Jan. 23, 1951 |
| 2,568,435 | Downey | Sept. 18, 1951 |
| 2,572,108 | Chalhoub | Oct. 23, 1951 |
| 2,611,873 | Gager et al. | Sept. 23, 1952 |
| 2,704,330 | Marker | Mar. 15, 1955 |

OTHER REFERENCES

Electrical Engineering, November 1946, vol. 65, pp. 711–725 (only pp. 720–723 relied upon). "Properties and Uses of Thermistors—Sensitive Resistors," Becker et al.